(12) United States Patent
Sekine et al.

(10) Patent No.: US 9,363,882 B2
(45) Date of Patent: Jun. 7, 2016

(54) NEUTRON GENERATION TARGET, DEVICE, AND METHOD

(75) Inventors: Takashi Sekine, Hamamatsu (JP); Toshiyuki Kawashima, Hamamatsu (JP); Hirofumi Kan, Hamamatsu (JP); Yoneyoshi Kitagawa, Hamamatsu (JP); Yoshitaka Mori, Hamamatsu (JP); Hirozumi Azuma, Seto (JP); Tatsumi Hioki, Nagoya (JP); Tomoyoshi Motohiro, Seto (JP); Yasushi Miyamoto, Toyota (JP); Naoki Nakamura, Toyota (JP)

(73) Assignees: HAMAMATSU PHOTONICS K.K., Hamamatsu-shi, Shizuoka (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 331 days.

(21) Appl. No.: 13/516,112

(22) PCT Filed: Dec. 15, 2010

(86) PCT No.: PCT/JP2010/072573
§ 371 (c)(1),
(2), (4) Date: Jul. 18, 2012

(87) PCT Pub. No.: WO2011/074612
PCT Pub. Date: Jun. 23, 2011

(65) Prior Publication Data
US 2012/0307950 A1 Dec. 6, 2012

(30) Foreign Application Priority Data

Dec. 16, 2009 (JP) .................. 2009-285383

(51) Int. Cl.
*H05H 1/22* (2006.01)
*H05H 6/00* (2006.01)
(Continued)

(52) U.S. Cl.
CPC .. *H05H 6/00* (2013.01); *G21B 1/19* (2013.01); *G21B 3/006* (2013.01); *Y02E 30/16* (2013.01)

(58) Field of Classification Search
CPC ............................................... G21B 1/19
USPC ......................................... 376/103, 151, 152
See application file for complete search history.

(56) References Cited

U.S. PATENT DOCUMENTS 2,847,331 A * 8/1958 Ashley ........................ 376/151
3,646,348 A * 2/1972 Detaint ........................ 376/151
(Continued)

FOREIGN PATENT DOCUMENTS

| CN | 101377962 | 3/2009 |
| CN | 101529998 | 9/2009 |

(Continued)

OTHER PUBLICATIONS

Park et al. "High Adiabat High-Foot Inertial Confinement Fusion Implosion Experiments on the National Ignition Facility" 2014.*
(Continued)

*Primary Examiner* — Jack W Keith
*Assistant Examiner* — Sharon M Davis
(74) *Attorney, Agent, or Firm* — Drinker Biddle & Reath LLP

(57) ABSTRACT

An object is to be capable of inducing a nuclear fusion reaction at a relatively high efficiency and downsize a device. A nuclear fusion device 1 of the present invention includes a nuclear fusion target 7 including a target substrate 7a containing deuterium or tritium and a thin-film layer 7b containing deuterium or tritium stacked on the target substrate 7a, a vacuum container 5 for storing the nuclear fusion target 7, and a laser unit 3 for irradiating two successive first and second pulsed laser lights $P_1$, $P_2$ toward the thin-film layer 7b of the nuclear fusion target 7, and the intensity of the first pulsed laser light $P_1$ is set to a value that is smaller than that of the second pulsed laser light $P_2$ and allows peeling of the thin-film layer 7b from the target substrate 7a.

2 Claims, 2 Drawing Sheets

(51) Int. Cl.
*G21B 1/19* (2006.01)
*G21B 3/00* (2006.01)

(56) References Cited

U.S. PATENT DOCUMENTS

| | | | |
|---|---|---|---|
| 3,716,491 | A | 2/1973 | Yannopoulos et al. |
| 2002/0172317 | A1 | 11/2002 | Maksimchuk et al. |
| 2006/0039520 | A1* | 2/2006 | Takahashi et al. ............ 376/151 |

FOREIGN PATENT DOCUMENTS

| | | |
|---|---|---|
| JP | 51-24496 | 2/1976 |
| JP | 61-139787 | 6/1986 |
| JP | 62-280685 | 12/1987 |
| JP | H10-253785 | 9/1998 |
| JP | 2002-107494 | 4/2002 |
| JP | 2002-514740 | 5/2002 |
| WO | WO 99/56521 | 11/1999 |

OTHER PUBLICATIONS

Edwards et al. "Progress towards ignition on the National Ignition Facility" 2013.*
"Laser fusion experiment yields record energy atr Lawrence Livermore's National Ignition Facility" 2013.*
Lawson "Some Criteria for a Power Producing Thermonuclear Reactor" 1956.*
Seife "Sun in a Bottle" Chapter 10 2008.*
Belyaev, V.S., et al., "Effect of Prepulses with Various Durations on the Neutron Yield in Laser Picosecond Plasma" Laser Physics, 2006, vol. 16, No. 12, pp. 1647-1657.*
G. Pretzler et al., "Neutron production by 200 mJ ultrashort laser pulses," The American Physical Society, Physical Review E, Jul. 1998, pp. 1165-1168, vol. 58, No. 1.
Uichi Kubo et al., "Development of a coating technique for inertial confinement fusion plastic targets," American Vacuum Society, J. Vac. Sci. Technol.A, Jan. 23, 1986 (received date), pp. 1134-1137, vol. 4, No. 3.
Kunioki Mima et al., "Conceptual Design of Inertial Confinement Fusion Power Plant," Journal of Plasma and Fusion Research, Apr. 30, 1994 (received date), pp. 612-622, vol. 70, No. 6, including English abstract.
Yasuji Kozaki, "Inertial Fusion Reactor Design," Journal of Plasma and Fusion Research, Aug. 5, 1998 (received date), pp. 952-956, vol. 74, No. 9, including English abstract.
Liseykina et al., "Laser acceleration of ion bunches by circularly polarized pulses", 32nd Conference on Plasma Physics, Tarragona, vol. 29C, No. P-4.149, Jun. 27-Jul. 1, 2005, pp. 1-4, XP002752491.
A. Macchi, "A femtosecond neutron source", Applied physics. B, Lasers and optics, vol. 82, No. 3, 2006, pp. 337-340, XP002752492.

* cited by examiner

NEUTRON GENERATION TARGET, DEVICE, AND METHOD

TECHNICAL FIELD

The present invention relates to a nuclear fusion target, nuclear fusion device, and nuclear fusion method using laser light.

BACKGROUND ART

Conventionally, it has been studied to use laser light in order to produce nuclear fusion in a highly controlled manner by using a small-sized and low-cost device. Further, through recent research, a great improvement in neutron production efficiency by a nuclear fusion reaction using a laser unit has been expected, and such a neutron production method using a nuclear fusion reaction has come to be expected as a safer method than by a nuclear fission reaction.

As conventional examples of nuclear fusion production methods using laser light, ones of the following non-patent document 1 and the following patent document 1 have been known. In the method described in the following patent document 1, an irradiation member prepared by coating deuterium substituted plastic on a thin film of Mylar or the like is momentarily irradiated with laser light to produce high-energy hydrogen nuclei, and a target member disposed at approximately a predetermined distance from the irradiation member is irradiated with the hydrogen nuclei to induce a nuclear fusion reaction. On the other hand, in the method described in the following non-patent document 1, two laser pulses are successively made incident at a predetermined time interval (300 psec) onto a target prepared by forming a film of deuterium substituted polyethylene $(C_2D_4)_X$ on an aluminum plate to induce a nuclear fusion reaction.

CITATION LIST

Patent Literature

Patent Document 1: Japanese Patent Application Laid-Open No. 2002-107494

Non Patent Literature

G. Pretzler et al., "Neutron production by 200 mJ ultrashort laserpulses," Physical Review E, Volume 58, Number 1, The American Physical Society, July 1998, p. 1165-1168

SUMMARY OF INVENTION

Technical Problem

However, the nuclear fusion production method described in non-patent document 1 above, in which the target is plasmatized by the first laser pulse of the two laser pulses, and then ions in the plasma are heated to a high temperature by the second laser pulse to induce thermonuclear fusion, thus requires laser light of a relatively large energy for making the ion density in the plasma an optimum value to produce a thermonuclear fusion reaction efficiently. Moreover, in the nuclear fusion production method described in patent document 1 above, the energy efficiency is not sufficiently obtained. As a result, there is a tendency in both methods that it is difficult to produce a nuclear fusion reaction at a high energy efficiency.

Therefore, the present invention has been made in view of such problems, and an object thereof is to provide a nuclear fusion target, nuclear fusion device, and nuclear fusion method that is capable of inducing a nuclear fusion reaction at a relatively high efficiency, and that allows downsizing of the device.

Solution to Problem

In order to solve the above-described problems, a nuclear fusion target of the present invention is a nuclear fusion target for producing a nuclear fusion reaction by irradiating laser light, and includes a first target layer having a first film thickness containing deuterium or tritium, and a second target layer having a second film thickness thinner than the first film thickness stacked on the first target layer and containing deuterium or tritium.

Alternatively, a nuclear fusion device of the present invention includes the nuclear fusion target described above, a vacuum container for storing the nuclear fusion target, and a laser light irradiating section for irradiating laser light including two successive first and second pulsed lights toward the second target layer of the nuclear fusion target, and the intensity of the first pulsed light is set to a value that is smaller than that of the second pulsed light and allows peeling of the second target layer from the first target layer.

Alternatively, a nuclear fusion method of the present invention is a nuclear fusion method for producing a nuclear fusion reaction by irradiating laser light, and includes a step of disposing in a vacuum a nuclear fusion target including a first target layer having a first film thickness containing deuterium or tritium, and a second target layer having a second film thickness thinner than the first film thickness stacked on the first target layer and containing deuterium or tritium, and a step of irradiating laser light including two successive first and second pulsed lights toward the second target layer of the nuclear fusion target, and the intensity of the first pulsed light is set to a value that is smaller than that of the second pulsed light and allows peeling of the second target layer from the first target layer.

According to such a nuclear fusion target, nuclear fusion device, or nuclear fusion method, by disposing the nuclear fusion target including two layers of first and second target layers containing deuterium or tritium in a vacuum, and irradiating a first pulsed light toward the second target layer being a thin-film layer, the second target layer can be peeled from the first target layer. Thereafter, by irradiating a second pulsed light following the first pulsed light onto the second target layer with a predetermined time interval, an ion beam produced from the first target layer can be sufficiently accelerated toward the second target layer distant at a predetermined distance, so that a high-energy ion beam can be irradiated onto the first target layer. As a result, a nuclear fusion reaction can be produced at a high efficiency in the vicinity of the first target layer, and the production efficiency of neutrons is also improved. Simultaneously, adopting the target including the two target layers also makes downsizing of the device easy.

Advantageous Effects of Invention

According to the present invention, a nuclear fusion reaction can be induced at a relatively high efficiency, and the device can be downsized.

DESCRIPTION OF EMBODIMENTS

Figure 1:
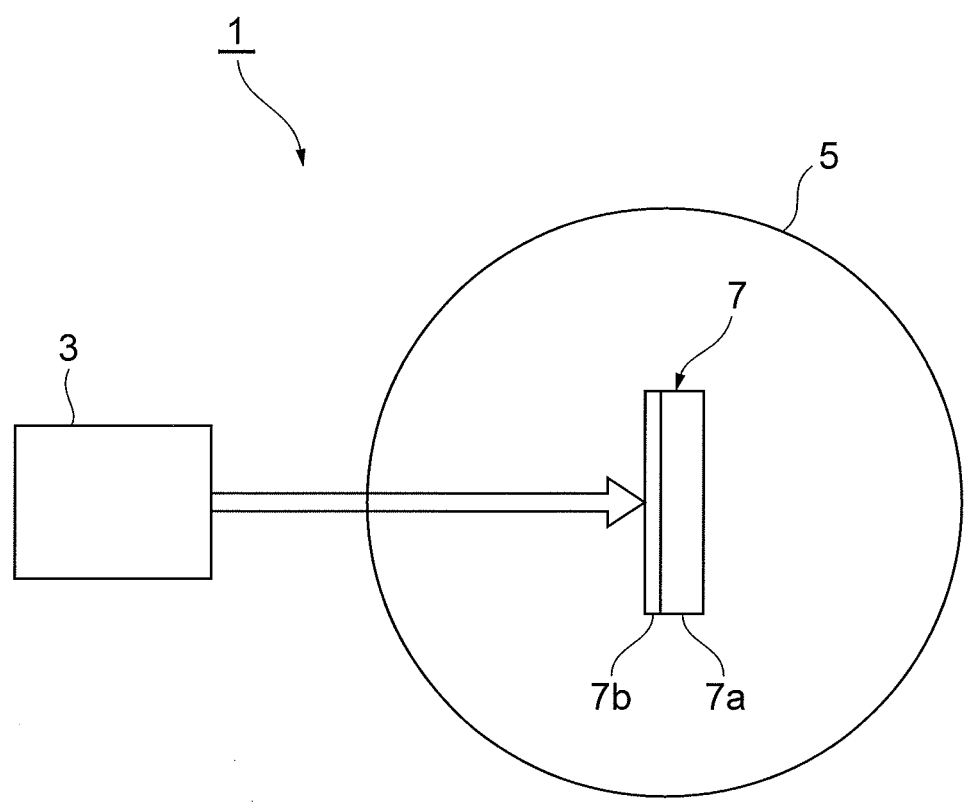
FIG. 1 is a schematic configuration diagram showing a structure of a nuclear fusion device 1 according to a preferred embodiment of the present invention.

Hereinafter, a preferred embodiment of a nuclear fusion device and nuclear fusion method according to the present invention will be described in detail with reference to the drawings. In the description of the drawings, the portions identical to or equivalent to each other are denoted by the same reference numerals and overlapping description will be omitted. The drawings are prepared for description, and are drawn so that the parts to be described are especially emphasized. Therefore, the dimensional ratios of the members in the drawings are not always coincident with actual ratios.

FIG. 1 is a schematic configuration diagram showing a structure of a nuclear fusion device 1 according to a preferred embodiment of the present invention. The nuclear fusion device 1 is a device for inducing a nuclear fusion reaction by laser light irradiation to generate neutrons, and includes a laser unit (laser light irradiating section) 3 for irradiating laser light, a vacuum container 5 the interior of which is maintained in a vacuum state, and a nuclear fusion target 7 stored in the vacuum container 5.

The laser unit 3 is a unit capable of irradiating ultrashort pulsed laser light having a pulse width of approximately 100 fs, using as its laser medium, for example, titanium-sapphire crystal, and having a built-in beam splitter section, pulse delay section, beam coupler section, etc. Moreover, the laser unit 3 is arranged so as to be capable of successively irradiating ultrashort pulsed laser light at predetermined time intervals (for example, a few hundred picosecond intervals). The laser unit 3 is disposed so as to irradiate ultrashort pulses toward the nuclear fusion target 7 in the vacuum container 5.

The nuclear fusion target 7 has a double-layer structure including a target substrate (first target layer) 7a and a thin-film layer (second target layer) 7b stacked on the target substrate 7a, in which the target substrate 7a is supported so as to has its surface on the side of the thin-film layer 7b facing the side of the laser unit 3.

The target substrate 7a is a solid material in a flat plate shape having a film thickness of a few hundred micrometers to approximately 1 mm containing deuterium or tritium, and for which hydrogen in the solid material has been substituted with deuterium or tritium. For example, as the material of the target substrate 7a, deuterium substituted polystyrene $(C_8D_8)_X$ for which hydrogen in an organic material containing carbon and hydrogen such as plastic represented by polystyrene $(C_8D_8)_X$ has been substituted with deuterium is used.

The thin-film layer 7b to be stacked on the target substrate 7a having the above-described composition is a metal thin film having a film thickness of 1 μm or less thinner than the target substrate 7a, containing deuterium or tritium, and prepared by making a metal thin film absorb deuterium or tritium. For example, as the thin-film layer 7b, a heavy metal such as titanium or palladium that easily absorbs hydrogen is used, and the thin-film layer 7b is formed by vapor-depositing such heavy metal on the target substrate 7a with a film thickness of a few nanometers to a few tens of nanometers and then making the same absorb deuterium.

Here, the target substrate 7a and the thin-film layer 7b may contain either deuterium or tritium, and may contain both at an appropriate rate.

Next, the procedure for inducing a nuclear fusion reaction in the nuclear fusion device 1 described above will be described in greater detail, and a nuclear fusion method using laser light according to the present embodiment will be described.

First, the nuclear fusion device 1 is prepared, the nuclear fusion target 7 is disposed in the vacuum container 5 so as to make the thin-film layer 7b face in a laser irradiating direction of the laser unit 3, and then the interior of the vacuum container 5 is vacuumed to a predetermined degree of vacuum.

Thereafter, a first pulsed laser light having a pulse width of approximately 100 fs is irradiated from the laser unit 3 onto the thin-film layer 7b of the nuclear fusion target 7. Further, shortly thereafter, following the first pulsed laser light with a predetermined time interval, a second pulsed laser light having a pulse width of approximately 100 fs to 1 ps is irradiated from the laser unit 3 onto the thin-film layer 7b of the nuclear fusion target 7. Here, the second pulsed laser light may include a laser prepulse to generate preplasma.

At this time, the intensity of the first pulsed laser light is set to a value on the order of $10^{15}$ W/cm$^2$ and the intensity of the second pulsed laser light is set to a value on the order of $10^{18}$ W/cm$^2$, and the intensity of the first pulsed laser light is made sufficiently smaller than the intensity of the second pulsed laser light. The intensity of the first pulsed laser light is set to such an intensity as to cause peeling of the thin-film layer 7b from the target substrate 7a and not to plasmatize the material of the thin-film layer 7b. Moreover, the time interval between the first pulsed laser light and the second pulsed laser light is set to a few hundred picoseconds as such a value that the thin-film layer 7b is peeled from the target substrate 7a to fly approximately a distance of 1 to 10 μm. Specifically, in the present specification, "two successive pulsed lights" means two pulsed lights having such a time interval that the thin-film layer 7b is peeled from the target substrate 7a to fly approximately a distance of 1 to 10 μm.

Figure 2:
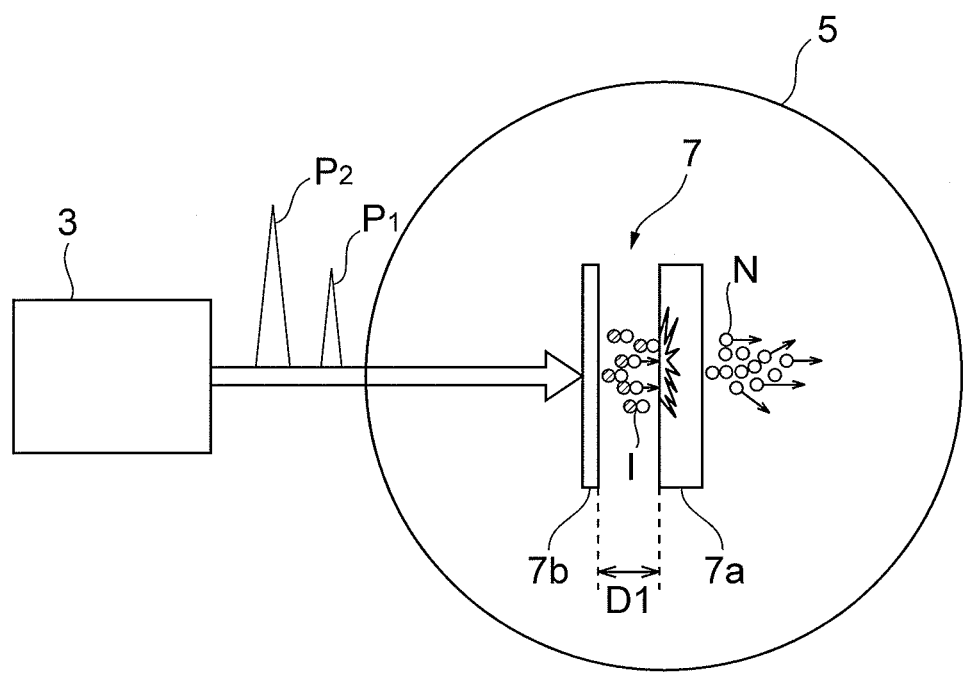
FIG. 2 is a conceptual diagram showing an induced state of a nuclear fusion reaction in the nuclear fusion device of FIG. 1.

FIG. 2 is a conceptual diagram showing an induced state of a nuclear fusion reaction in the nuclear fusion device 1. By setting the intensities and time interval of the first pulsed laser light $P_1$ and the second pulsed laser light $P_2$ as in the above, the thin-film layer 7b is peeled from the target substrate 7a shortly after irradiation with the first pulsed laser light $P_1$, and the second pulsed layer light $P_2$ is thereafter irradiated onto the thin-film layer 7b at a timing where the distance D1 between the thin-film layer 7b and the target substrate 7a has reached approximately 1 to 10 μm. As a result, in response to the irradiation of the second pulsed laser light $P_2$ onto the thin-film layer 7b, deuterium ions I are generated in the thin-film layer 7b, and the deuterium ions I are sufficiently accelerated between the thin-film layer 7b and the target substrate 7a to collide against the target substrate 7a. In response thereto, a D-D nuclear fusion reaction is induced between deuterium inside the target substrate 7a and the ions I, and neutrons N generated accordingly are emitted toward the outside of the vacuum container 5.

In addition, the irradiation timing of the second pulsed laser light $P_2$ is preferably a timing where the distance D1 has reached 1 μm or more for sufficient acceleration of deuterium ions, and is preferably a timing where the distance D1 has reached 10 μm or less so as not to reduce the density of deuterium ions reaching the target substrate 7a as a result of diffusion of deuterium ions.

According to the nuclear fusion device 1 and nuclear fusion method using the same described in the above, by disposing the nuclear fusion target 7 including two layers of the target substrate 7a and thin-film layer 7b containing deuterium or tritium in the vacuum container 5, and irradiating a first pulsed laser light toward the thin-film layer 7b, the thin-film layer 7b can be peeled from the target substrate 7a. Thereafter, by irradiating a second pulsed laser light following the first pulsed laser light onto the thin-film layer 7b with a predetermined time interval, an ion beam produced from the thin-film layer 7b can be sufficiently accelerated toward the target substrate 7a distant at a predetermined distance, so that a high-energy ion beam can be irradiated onto the target substrate 7a. As a result, a nuclear fusion reaction can be produced at a high efficiency inside of the target substrate 7a, and the production efficiency of neutrons in response to the nuclear fusion reaction is also improved. Simultaneously, as a result of adopting the arrangement of the nuclear fusion target 7 consisting of two layers being disposed in the vacuum container 5, a conventionally used large-scale accelerator and nuclear reactor are no longer necessary, so that downsizing of the device also becomes easy.

In particular, according to the present embodiment, an ion beam having directionality is made to collide against a target with sufficient acceleration to induce nuclear fusion, and thus in the case of a low laser energy condition, more neutrons can be produced relative to the input energy than by conventional thermonuclear fusion using laser light, so that a high energy efficiency can be achieved.

Here, the target substrate 7a is one for which hydrogen in a solid material containing hydrogen has been substituted with deuterium or tritium, and thus the disposing structure of the target substrate 7a in the vacuum container 5 is simplified, and stacking of the thin-film layer 7b onto the target substrate 7a also becomes easy. Further, the thin-film layer 7b is a metal thin film absorbed with deuterium or tritium, and thus the stacking process onto the target substrate 7a becomes easy. Therefore, the manufacturing process of the nuclear fusion target 7 and the integration process thereof into the nuclear fusion device 1 are in whole simplified.

In addition, the present invention is not limited to the foregoing embodiment. Other materials can also be used as the materials of the nuclear fusion target 7.

For example, as the target substrate 7a, a heavy water block for which heavy water ($D_2O$ or $T_2O$) has been frozen and solidified may be used. In this case, when forming the thin-film layer 7b, the thin-film layer 7b is formed by vapor deposition in an environment where the temperature is sufficiently controlled so as not to melt the heavy water. Moreover, irradiation with laser light for inducing nuclear fusion is also performed in the same temperature-controlled environment.

On the other hand, as the thin-film layer 7b, one for which hydrogen in a solid material has been substituted with deuterium or tritium, such as deuterium substituted polystyrene $(C_8D_8)_X$ in a thin film shape, is used, and the target substrate 7a on which the thin film is stacked may also be used.

Moreover, as a modification of the present embodiment, an ion accelerator can also be realized. The ion accelerator is the same in basic configuration as the nuclear fusion device 1, and is different only in the component of the target substrate 7a of the nuclear fusion target 7. Specifically, as the material of the target substrate 7a, a film-like member not containing deuterium or tritium, for example, an organic film having a film thickness of approximately 10 μm is used, and the organic film on which the thin-film layer 7b being deuterium absorbed titanium has been stacked is used as a target. According to such an ion accelerator, by irradiating the target with double pulsed laser light containing a first pulsed laser light and a second pulsed laser light, accelerated ions from the thin-film layer 7b toward the outside can be produced.

Here, it is preferable that the first target layer is a layer for which hydrogen in a solid material containing hydrogen has been substituted with deuterium or tritium. In this case, the disposing structure of the first target layer is simplified, and stacking of the second target layer also becomes easy.

Moreover, it is also preferable that the second target layer is a metal thin film absorbed with deuterium or tritium. Adopting such an arrangement makes the stacking process onto the first target layer easy.

Further, it is also preferable that the second target layer is a layer for which hydrogen in a solid material containing hydrogen has been substituted with deuterium or tritium. Adopting such an arrangement makes the stacking process of the second target layer onto the first target layer easy.

INDUSTRIAL APPLICABILITY

The present invention is used for applications of a nuclear fusion target, nuclear fusion device, and nuclear fusion method using laser light, and is capable of inducing a nuclear fusion reaction at a relatively high efficiency and allows downsizing of the device.

REFERENCE SIGNS LIST

1—Nuclear fusion device, 3—Laser unit (laser light irradiating section), 5—Vacuum container, 7—Nuclear fusion target, 7a—Target substrate (first target layer), 7b—Thin-film layer (second target layer), $P_1$—First pulsed laser light (first pulsed light), $P_2$—Second pulsed laser light (second pulsed light).

The invention claimed is:

1. A device for generating neutrons, comprising:
a target for emitting neutrons, comprising:
a first target layer in a flat plate shape having a first film thickness containing deuterium or tritium, the first target layer being made of polystyrene containing deuterium or tritium substituted for hydrogen; and
a second target layer having a second film thickness thinner than the first film thickness deposited on the first target layer, the second target layer being a thin film of a heavy metal absorbed with deuterium or tritium, wherein the second target layer has a film thickness of 1 μm or less;
a vacuum container for storing the target; and
a laser light irradiating section configured to irradiate laser light including two successive first and second pulsed lights toward the second target layer of the target,
wherein the first pulsed light has a first intensity and the second pulsed light has a second intensity, and
wherein the first intensity is smaller than the second intensity and the first intensity is set to a value on the order of $10^{15}$ W/cm$^2$ so as not to plasmatize the material of the second target layer and to allow peeling of the second target layer from the first target layer, and the second intensity is set to a value on the order of $10^{18}$ W/cm$^2$.

2. A method for generating neutrons, comprising the steps of:
disposing in a vacuum a target for emitting neutrons including a first target layer having a first film thickness containing deuterium or tritium, the first target layer being made of polystyrene containing deuterium or tritium substituted for hydrogen, and a second target layer having a second film thickness thinner than the first film thickness deposited on the first target layer, the second target layer being a thin film of 1 μm or less of a heavy metal absorbed with deuterium or tritium; and
irradiating laser light including two successive first and second pulsed lights toward the second target layer of the target, wherein the intensity of the first pulsed light is set to a value on the order of $10^{15}$ W/cm² so as not to plasmatize the material of the second target layer, is smaller than that of the second pulsed light, and allows peeling of the second target layer from the first target layer, and the second intensity is set to a value on the order of $10^{18}$ W/cm², and wherein the second pulsed light is irradiated onto the second target layer peeled from the first target layer a time of a few hundred picoseconds after irradiating the first pulsed light where a distance between the second target layer and the first target layer has reached 1 to 10 µm.

* * * * *